United States Patent [19]

Leffingwell

[11] 4,217,400
[45] Aug. 12, 1980

[54] RECHARGEABLE ELECTROCHEMICAL CELL PACK HAVING OVERCURRENT PROTECTION

[75] Inventor: Edward A. Leffingwell, Gainesville, Fla.

[73] Assignee: General Electric Company, Gainesville, Fla.

[21] Appl. No.: 930,727

[22] Filed: Aug. 3, 1978

[51] Int. Cl.² .......................................... H01M 14/00
[52] U.S. Cl. .......................................... 429/7; 429/61; 429/93
[58] Field of Search .................. 429/61, 93, 9, 1, 7, 429/99, 149–155

[56] References Cited
U.S. PATENT DOCUMENTS

| 3,673,001 | 6/1972 | Tolmie | 429/61 |
| 3,937,636 | 2/1976 | Slautterback | 429/7 |
| 4,011,366 | 3/1977 | Bones et al. | 429/61 |
| 4,028,478 | 6/1977 | Tucholski | 429/61 |

Primary Examiner—Charles F. LeFevour
Attorney, Agent, or Firm—Morgan, Finnegan, Pine, Foley & Lee

[57] ABSTRACT

A rechargeable electrochemical cell pack is provided having a casing holding a plurality of electrically interconnected cells and having circuit breaking means to guard against the possibility of excessive supply and consumption of electrical power and the risk of damage or injury incident thereto. The circuit breaker comprises a small current fuse contained internally of the cell pack so as to give an external visible indication of its state and is removably mounted on an access door for replacement purposes.

11 Claims, 5 Drawing Figures

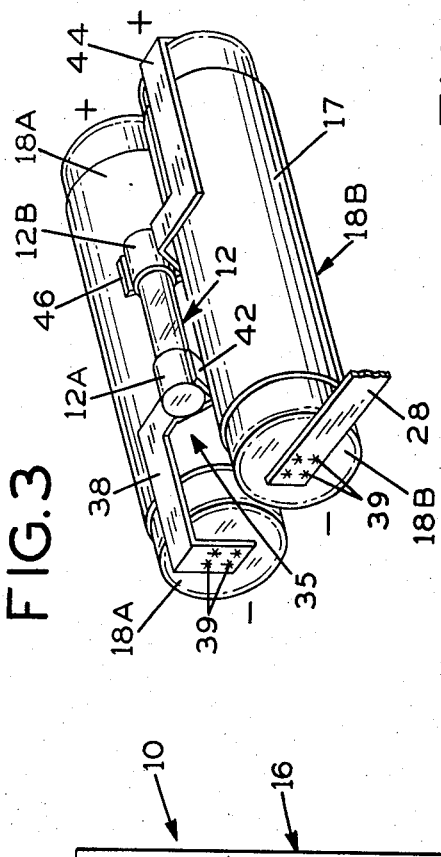
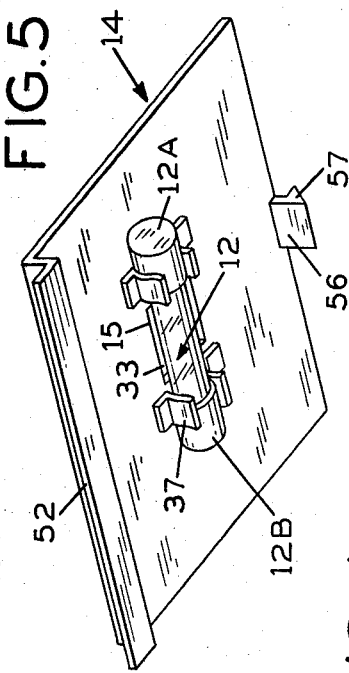
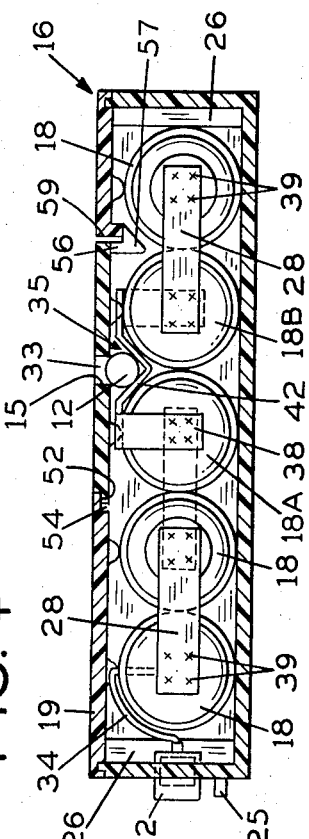
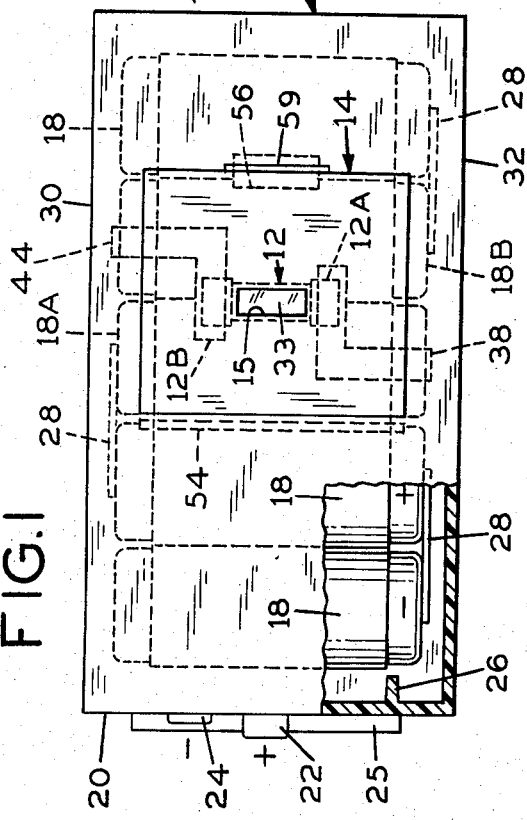
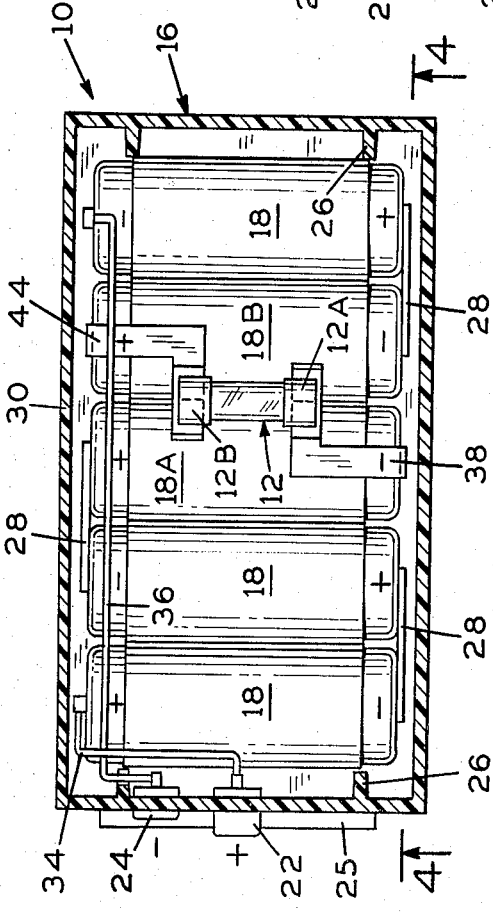

RECHARGEABLE ELECTROCHEMICAL CELL PACK HAVING OVERCURRENT PROTECTION

FIELD OF THE INVENTION

The present invention relates to rechargeable electrochemical cell packs; more specifically, it relates to rechargeable electrochemical cell packs having self-contained circuit breaker means for preventing excessive charge and discharge rates for the cell circuit.

BACKGROUND OF THE INVENTION

Rechargeable electrochemical cells, such as nickel-cadmium cells, have been assimilated to a wide range of end uses. Such cells are now commonplace not only in industrial environments, but on the mass consumer market. As the scope of use has expanded, so has the likelihood of misuse and misapplication of the cells by the user, either during the discharge or charge cycle.

Among the problems caused by excessive current flow through the cells are those of cell degradation or, in the case of malfunction of a vented cell, dangerous overpressure and overtemperature conditions in the cell. These conditions present the risk of damage being caused to the cell or to equipment in electrical connection with the cell. Indeed, these conditions may even present the possibility of injury being caused to a user. Such problems are amplified by the use of several interconnected electrochemical cells which produce higher voltages and higher current drain capacity. Moreover, the use of several individual cells in a single battery unit (cell pack) increases the probability of malfunction.

Encasing the cell pack of electrochemical cells in a material capable of withstanding appreciable amounts of heat and pressure can provide a solution to these difficulties. However, such a casing would detract from the overall convenience and efficiency of the cell pack. Fusing the cell pack by conventional techniques such as placing a fuse in the vicinity of the power source or permanently soldering a fuse into place also presents difficulties because the portable nature of the cell packs requires a compact source structure which can be readily maintained.

Although most cells are equipped with small built-in pressure release valves to vent internal gases in the event of an overpressure condition, the possibility still remains that an overpressurized cell may cause damage to the cell pack or to the equipment the cell pack powers or is being charged with. Moreover, cell performance can be seriously downgraded in the event of such overpressure conditions. For example, during a venting period early in the cell life, some of the electrolyte in minature droplet form can be entrained in the vented gas stream. Should repeated venting occur due to pressure increases at high current loadings, a significant loss of electrolyte and gases is likely.

Excessive cell temperature conditions are aggravated whenever a plurality of cells are grouped together, since each cell is in effect a heat generating source. When placed in a common container or package, the rate of dissipation of internally generated heat to the environment is reduced, and the cells operate at higher equilibrium temperatures. Such temperatures are directly related to the amount of current flowing through the cell during charging and discharging. As current increases, heat generated through the cell's internal resistance $R_c$ increases according to the formula $I^2R_c$. Not only do excessive temperature promote excessive cell pressures and the risk of damage or injury incident thereto, prolonged exposure of the cell to high temperatures hastens decomposition of the separator and seal materials.

The foregoing considerations highlight the need for an effective means of overcurrent protection which will preclude excessive current flow through a multi-cell battery pack.

Among the objects of the invention, therefore, is to provide a rechargeable electrochemical cell pack having circuit breaker means for protecting the cell pack and its surrounding equipment against overcurrent conditions.

Another object of the invention is to provide rechargeable electrochemical cell packs having circuit breaker means which can be manufactured cheaply and in a compact configuration which does not increase the overall dimensions of the unit.

These and other objects will become apparent from the following summary and description of the invention taken in conjunction with the accompanying drawings.

SUMMARY OF THE INVENTION

Broadly contemplated, the present invention provides a rechargeable electrochemical cell pack having self-contained overcurrent protection. The cell pack comprises:

(a) a casing having exterior connection terminals; and (b) a plurality of rechargeable electrochemical cells mounted in the casing and interconnected with the exterior terminals in a series electrical circuit which includes circuit breaker means.

The circuit breaking means is positioned within the casing, preferably in an interior space between adjacent cells, and is disposed so as to provide a visible indication at the casing exterior. In the preferred embodiment, the circuit breaking means comprises a fusible link type device which is carried at the underside of a removable cover so as to mate with electrical contacts at the casing interior when the cover is in place.

DESCRIPTION OF THE DRAWINGS

FIG. 1 is a plan view of a preferred cell pack according to the invention, partially broken away at the top to show the position of individual cells at the interior;

FIG. 2 is a plan similar to FIG. 1, with the top removed;

FIG. 3 is a perspective view of two cells of the cell pack, showing one arrangement for connecting a circuit breaking fuse in the battery circuit;

FIG. 4 is a sectional side view taken generally along line 4—4 of FIG. 2; and

FIG. 5 is a perspective view looking upward on a removeable door associated with the FIG. 2 cell pack.

DETAILED DESCRIPTION OF THE INVENTION

Referring now to the drawings wherein like numerals are used to indicate like parts throughout the various figures, FIG. 1 illustrates the preferred form of rechargeable cell pack 10 according to the invention. It is understood that the term "cell pack" denotes a unitary package including two or more individual electrochemical cells which are electrically interconnected, usually in series.

Cell pack 10 is a rechargeable system capable of providing electrical power for a wide variety of purposes. Depending upon the number of internal individual cells and their manner of interconnection, any of a wide variety of voltages and current ratings can be provided.

For purpose of illustration, five electrochemical storage cells are shown in cell pack 10. Nickel-cadmium cells have a nominal operating voltage of 1.25 V.D.C. Thus, the overall cell pack terminal voltage in this case will be about 6 V.D.C. A typical cell is the AA size cell 10 which, in physical dimension, measures about 0.59 inches in diameter and about 1.95 inches in longitudinal length, and has a rated capacity of 500 mAh. It will be understood, of course, that the invention is applicable to cells of all sizes and ratings. Cylindrical sealed cells range from about 0.54 inch to about 1.27 inches in diameter and from about 0.6 inch to about 3.4 inches in length. Such cells are rated from about 0.1 Ah to about 5.6 Ah. Suitable nickel-cadmium cells and their charge and discharge characteristics are described in the Nickel-Cadmium Battery Application Engineering Handbook, published by General Electric Company, Battery Business Department, Gainsville, Fla.

Cell pack 10 is rectangular in shape and generally includes casing 16 which houses the five electrochemical cells 18 and a cover assembly 19. This cover assembly includes a removable inspection door 14 having a viewing port, or window 15, through which can be seen a visible indication of the state of a circuit breaker element 12 (e.g., a fuse). Casing 16 and cover 19 can be fabricated from a wide variety of materials suitable for housing electrical equipment, preferably polystyrene. Positioned on end wall 20 of the casing are terminal connectors 22 and 24. These terminals can be of the pressure contact type or they can be conventional snap type connectors used for making electrical contact with the equipment to be powered as well as the recharging equipment (neither shown). Terminals 22 and 24 can have a wide variety of shapes and sizes. Also positioned on side wall 20 is a projecting rib 25 used to align a terminal strip or recharging equipment.

As best seen in FIG. 2, cells 18 are arranged side by side in the housing 16 so that the adjacent cells abut or nearly abut; the pack thickness is thus principally determined by the diameter of the cells. The cells are provided with insulating sleeves 17 (FIG. 3) to preclude shorting of adjacent cell casings when the cells are series connected, since the casings also constitute the negative battery terminals. In order to prevent cells 18 from shifting, cell pack casing 16 is provided with spacers 26 which extend inwardly into the interior space of the cell pack. If desired, these spacers can be made resilient to absorb shock and reduce cell movement, or they can be contoured to conform to the curved outline of the abutting cell.

As indicated above, the cells 18 are connected in series. Although a number of cell positioning arrangements can be employed, the preferred method is to arrange the cells so that the terminal polarity alternates from one cell to the next, with the exception of two middle cells whose terminal polarities match. By arranging the cells in this manner, all but one of the series connections between the cells are affected by strap connectors 28 positioned along the longitudinal side walls 30 and 32 of casing 16. Thus, as will be seen in FIG. 1, three connectors 28 are employed to make all but one of the connections between the cells. Connectors 28 are conventional and can be simple metal clips supported by casing 16, or they can be sheet metal strips welded directly to the cell ends, as shown in FIGS. 3 and 4. To complete the circuit, terminals 22 and 24 are connected to opposite poles of the first and last cells of the series circuit by wire leads 34 and 36 (FIG. 2).

As indicated earlier, the series cell circuit within the cell pack is provided with circuit breaking means to preclude its supply or consumption of excessive power. This circuit breaker means can be adapted to operate over a wide range of power levels to prevent the cell pack and the surrounding equipment from being damaged. Generally, the circuit breaker means will be adapted so that the cell circuit will be broken at power levels which are unduly high and which prevent a substantial risk of damage being caused to the cell pack and to equipment in electrical connection with the cell pack. In this way, although current levels may be reached which may cause some damage to individual cells, power levels will not be reached which would present the risk of damage to equipment or injury to the user.

The circuit breaking means is so located that it does not increase the overall dimensions of the cell pack, is not costly to manufacture, is readily visible for inspection by the user, does not appreciably increase the internal impedance of the battery circuit and yet is reliable and fatigue resistant.

Considering now FIGS. 2-4, the circuit breaking fuse 12 is seen to partially occupy the void 35 formed between adjacent cells 18A, 18B, and to partially occupy a recess 33 formed in the removable cover 14. Turning momentarily to FIG. 5, the manner of mounting fuse 12 will be apparent. The removable cover 14, or door, is provided with spring clip fuse holders 37 which extend downwardly from the door's underside. Fuse 12 is positioned on door 14 so that, when the door is fitted into casing 16, fuse contact ends 12a and 12b register and make electrical contact with mating contacts inside the casing. The clips 37 supporting the fuse can constitute projections molded integrally with the door 14 instead of the separate metal clips illustrated.

Returning to FIGS. 2-4, the fuse contacts inside the casing are formed from specially formed conductive metal strips 38, 44. Conductive strip 38 is directly affixed to the casing of cell 18A by welds 39 at the negative cell terminal whereas a similarly formed strip 44 is welded to the positive terminal of cell 18B. For reasons discussed hereafter, conductive strips 38 and 44 are fabricated from a resilient spring-like material capable of retaining its shape even under long periods of stress.

As best seen in FIGS. 2, 3 and 4, conductive strip 38 extends upwardly from the cell and then longitudinally along the side of cell 18A for a portion of the cell length; it then turns perpendicularly toward cell 18B and downwardly into intercell space 35 formed between cells 18A and 18B. Conductive strip 38 terminates in a V-shaped end portion 42 which, as will be seen in FIGS. 3 and 4, provides a fuse receiving groove facing upwardly toward the door 14. (In FIG. 3 the fuse is shown in solid lines to illustrate its location when the door is in place.) Conductive strip 44 is identical to conductive strip 38 and, thus, a common manufacturing procedure can be used to form each. It, too, is positioned so that its V-shaped portion 46 occupies the intercell space with its open end facing the door 14. V-shaped end portions 42 and 46 are spaced so as to register with contact ends 12a and 12b of the fuse. The V-shape of resilient end portions 42 and 46 enables them to conform to the fuse contacts and to adjust for distance as the door 14 is put into place.

As is best apparent in FIG. 4, the cells in the casing 16 may actually cooperate with the conductive fuse contact strips 38, 44 so as to impart mechanical integrity to the fuse-to-battery connection. When the fuse is in place, it bears down on V-shaped portions 42, 46 which, in turn may be supported by the casings of cells 18A, 18B. Thereupon resilient pressure is applied to the contact points by flexing of the arms of the V-shaped ends 42, 46. Though the V-shaped ends 42, 46 may contact the cells, they remain electrically isolated owing to the insulating sleeves 17 which surround the cell casings. An additional feature of using the strips 38, 44 is the fact that they can be welded directly to, and supported by, the cells 18, with the cells themselves holding the strips in position. This means that no additonal manufacturing steps are required for assembly of the cell pack, since the fuse contacting strips 38, 44 simply take the place of an interconnecting strap 28 during welding operations.

It will be observed that stick type fuse 12 is accommodated partly by the intercell space 35 and partly by the recess 33 in door 14 so as to avoid any substantial increase in the dimensions of the casing by virtue of the circuit breaker feature. Moreover, ready access to fuse 12 is provided by mounting the fuse on the removable door so as to eliminate the need to insert fingers or tools into the casing for the purpose of fuse removal.

Directing attention to FIGS. 4 and 5, door 14 is rectangular in shape and adapted to be snap-fitted into an opening in the top 19 of casing 16. A downwardly offset lip 52 running along one edge of door 14 is dimensioned to be received in a longitudinal recess 54 in casing 16. The opposite edge of the door is formed with a downturned portion 56 terminating in a latching hook 57 which engages the underside of the facing edge portion 59 of the casing. Because of the generally flexible nature of the casing material, the beveled portion of hook 57 yields upon engaging casing edge portion 59, and then snaps resiliently to the position shown in FIG. 4 when fully in place to hold the door 14 securely in place while exerting sufficient downward pressure on the fuse 12 to form good electrical contact with the strip connectors 38, 44 so as to complete the battery circuit.

In summary, the invention provides a compact cell pack arrangement wherein the battery circuit is protected against overcurrent conditions. This feature is provided in a low cost manner adapted to mass production and is combined with the cell pack such that its size and convenience are not disadvantageously affected. To the contrary, the cell pack includes means whereby a circuit breaking fuse is accommodated at the interior of the cell pack such that its condition is visible at the pack exterior. The use of resilient fuse contacts permanently affixed to the battery pack and cooperating with the cells facilitates easy removal of the fuse and assists in the integrity of the connection.

While I have shown in the drawings and have described in detail one preferred embodiment of the invention, it is to be understood that this description is an exemplification. Certain variations and adaptions can be made to the cell pack described above without departing from the spirit of the invention which is to be limited only by the scope of the appended claims.

What I claim is:

1. A rechargeable electrochemical cell pack comprising:

a casing having positive and negative terminals at the exterior thereof for connection to an external circuit;

a plurality of rechargeable electrochemical cells housed in said casing, at least two of said cells defining a space between said at least two of said cells;

means at the interior of the casing for interconnecting said cells in a series circuit between said casing terminals, said series circuit including a pair of electrically isolated contacts, each of said electrically isolated contacts having a terminal receiving portion, said terminal receiving portion being positioned in said space between said at least two of said cells;

circuit breaking means positioned within said casing in generally parallel relation to said at least two of said cells and at least partially occupying said space between said at least two of said cells, said circuit breaking means being positioned between said terminal receiving portions of said pair of electrically isolated contacts for completing said series circuit and for interrupting said series circuit when the current flow therethrough exceeds a predetermined level; and a removable door in said casing, said circuit breaking means being in registering relation with said removable door so that said circuit breaking means is firmly held in position in said casing when said removable door is in place.

2. The cell pack of claim 1, wherein:
the casing includes a viewing port registered with said circuit breaking means so as to present a visible indication outside the casing of the conductive state of said circuit breaking means.

3. The cell pack of claim 1,
wherein said circuit breaking means is carried by said removable door.

4. The cell pack of claim 3 wherein:
said electrochemical cells are cylindrical and are mounted in said casing side by side.

5. The cell pack of claim 4, wherein:
said circuit breaking means comprises a stick type fuse, said fuse being positioned in generally parallel relation to said cells and at least partially occupying the space formed between two adjacent cells.

6. The cell pack of claim 3, further comprising:
means at the interior surface of said door for releasably holding said circuit breaking means, said circuit breaking means comprising a fuse.

7. The cell pack of claim 3, wherein:
said door includes an offset edge portion for engaging an undersurface at one location of the casing, and a downwardly projecting hook portion physically displaced from said offset edge portion for yieldably and releasably engaging said casing undersurface at a different location.

8. The cell pack of claim 1, wherein:
said isolated contacts comprise conductive strips affixed to opposite terminals of two of said cells.

9. The cell pack of claim 7, wherein:
the circuit breaking means comprises a stick type fuse, and
the terminal receiving portions of said conductive strips are V-shaped and are formed of a resilient material so as to yieldably accommodate the terminals of said fuse.

10. In a cell pack for electrochemical storage cells, having
- a casing with a pair of terminals at the exterior thereof for connection to an external circuit, and
- a plurality of electrically interconnected cells, the improvement comprising:
- at least two of said cells defining a space between said at least two of said cells;
- a circuit breaking element carried by the casing;
- interconnecting means inside the casing for connecting the cells in a series circuit between the exterior terminals, said interconnecting means including a pair of isolated contacts, each of said pair of isolated contacts having a terminal receiving portion, said terminal receiving portion being positioned in said space between said at least two of said cells; said circuit breaking element being connected to said terminal receiving portions of said isolated contacts so as to complete the series circuit and to interrupt said circuit when the current therethrough exceeds a predetermined level, said circuit breaking element being positioned in generally parallel relation to said cells and at least partially occupying said space between said at least two of said cells; and
- a removable casing portion supporting said circuit breaking element, said circuit breaking element having terminals in physical registration with, and electrically contacting, said isolated contacts when said removable casing portion is in place.

11. The cell pack of claim 10 wherein:
said isolated contacts are formed so as to resiliently receive the terminals of said circuit breaking elements.

* * * * *